(12) United States Patent
Lei et al.

(10) Patent No.: US 11,682,919 B2
(45) Date of Patent: Jun. 20, 2023

(54) INTELLIGENT CONTROL SYSTEM, EMERGENCY STARTING POWER SUPPLY, AND INTELLIGENT BATTERY CLIP

(71) Applicant: SHENZHEN CARKU TECHNOLOGY CO., LIMITED, Guangdong (CN)

(72) Inventors: Yun Lei, Guangdong (CN); Zhifeng Zhang, Guangdong (CN); Ming Cheng, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 0 days.

(21) Appl. No.: 17/234,096

(22) Filed: Apr. 19, 2021

(65) Prior Publication Data
US 2022/0085646 A1    Mar. 17, 2022

(30) Foreign Application Priority Data
Sep. 14, 2020    (CN) .......................... 202010963095.2

(51) Int. Cl.
*H02J 7/34*    (2006.01)
*H02J 1/10*    (2006.01)
*H02J 7/00*    (2006.01)

(52) U.S. Cl.
CPC .............. *H02J 7/342* (2020.01); *H02J 1/122* (2020.01); *H02J 7/0034* (2013.01); *H02J 2310/48* (2020.01)

(58) Field of Classification Search
CPC ................................ H02J 1/122; H02J 7/0034
See application file for complete search history.

(56) References Cited

U.S. PATENT DOCUMENTS

2002/0155752 A1* 10/2002 Winkle ............. H01M 10/4207
439/504
2015/0306964 A1   10/2015 Wang
(Continued)

FOREIGN PATENT DOCUMENTS

EP       0616409 A2   9/1994

OTHER PUBLICATIONS

The Extended European Search Report issued in corresponding EP Application No. EP21187041.5, dated Dec. 15, 2021.

*Primary Examiner* — Daniel Cavallari
(74) *Attorney, Agent, or Firm* — Hauptman Ham, LLP

(57) ABSTRACT

An intelligent control system, an emergency starting power supply, and an intelligent battery clip are provided. The intelligent control system a microcontroller unit (MCU), a load-detection module, a switch-control module, an emergency starting power supply, a load, and a power-supply output port. The power-supply output port is electrically coupled with the load. The switch-control module includes a first terminal coupled with an internal battery pack of the emergency starting power supply, a second terminal electrically coupled with the load via the power-supply output port, and a control terminal configured to receive a control signal from the MCU. The load-detection module is configured to detect a state of the load and includes a non-isolated member. The MCU is configured to control, according to the state of the load, the switch-control module to be in a switched-on state or a switched-off state.

31 Claims, 11 Drawing Sheets

(56) References Cited

U.S. PATENT DOCUMENTS

| | | | | |
|---|---|---|---|---|
| 2018/0102659 A1* | 4/2018 | Chen | .................... | H02J 7/0045 |
| 2020/0072177 A1* | 3/2020 | Clarke | ................ | F02N 11/087 |
| 2022/0069574 A1* | 3/2022 | Liao | ..................... | H02J 7/0034 |

* cited by examiner

INTELLIGENT CONTROL SYSTEM, EMERGENCY STARTING POWER SUPPLY, AND INTELLIGENT BATTERY CLIP

CROSS-REFERENCE TO RELATED APPLICATION(S)

This application claims priority to Chinese Patent Application No. 202010963095.2, filed on Sep. 14, 2020, the disclosure of which is hereby incorporated by reference in its entirety.

TECHNICAL FIELD

This disclosure relates to the technical field of electronic circuits, and particularly to an intelligent control system, an emergency starting power supply, and an intelligent battery clip.

BACKGROUND

At present, a design principle of a polarity detection when an intelligent battery clip and an emergency starting power supply are electrically coupled with an automobile storage battery on the market is as follows. A microcontroller unit (MCU) determines whether a polarity connection is correct according to an output signal of a photoelectric isolated member (as a key detection member, such as a photocoupler).

Due to environmental sensitivity, slow response, short lifespan, and easy failure of the photoelectric isolated member, a signal transmitted by the photoelectric isolated member to the MCU has a relatively long delay or even a normal output signal cannot be transmitted. When an external automobile storage battery is in abnormal connection (e.g., in polarity reverse connection), due to a slow switching speed or the failure of the photoelectric isolation sensor, the MCU cannot respond in time or cannot respond to the abnormal connection or reverse polarity input so as to disconnect components of an output circuit (e.g., power switch units) in time. As a result, it is easy to cause damage to a system internal circuit or a battery, and even serious situations may cause security accidents.

SUMMARY

In a first aspect of the disclosure, an intelligent control system is provided. The intelligent control system includes a microcontroller unit (MCU), a load-detection module, a switch-control module, an emergency starting power supply, a load, and a power-supply output port. The power-supply output port is electrically coupled with the load. The switch-control module includes a first terminal coupled with an internal battery pack of the emergency starting power supply, a second terminal electrically coupled with the load via the power-supply output port, and a control terminal configured to receive a control signal from the MCU. The load-detection module is configured to detect a state of the load and includes a non-isolated member. The MCU is configured to control, according to the state of the load, the switch-control module to be in a switched-on state or a switched-off state.

In a second aspect of the disclosure, an emergency starting power supply is provided. The emergency starting power supply includes an MCU, an internal battery pack, a switch-control module, and a load-detection module. The switch-control module includes a first terminal electrically coupled with the internal battery pack, a second terminal electrically coupled with a load, and a control terminal configured to receive a control signal from the MCU. The load-detection module is configured to detect a state of the load, where the load-detection module includes a non-isolated member. The MCU is configured to control, according to the state of the load, the switch-control module to be in a switched-on state or a switched-off state.

In a third aspect of the disclosure, an intelligent battery clip is provided. The intelligent battery clip includes an MCU, a power-supply input port, a power-supply output port, a switch-control module, a load-detection module. The power-supply input port is electrically coupled with an internal battery pack of an emergency starting power supply. The power-supply output port is electrically coupled with a load. The switch-control module includes a first terminal electrically coupled with the internal battery pack via the power-supply input port, a second terminal electrically coupled with the load via the power-supply output port, and a control terminal configured to receive a control signal from the MCU. The load-detection module is configured to detect a state of the load, where the load-detection module includes a non-isolated member. The MCU is configured to control, according to the state of the load, the switch-control module to be in a switched-on state or a switched-off state.

BRIEF DESCRIPTION OF THE DRAWINGS

In order to describe technical solutions of implementations or the related art more clearly, the following will give a brief description of accompanying drawings used for describing the implementations or the related art. Apparently, accompanying drawings described below are merely some implementations. Those of ordinary skill in the art can also obtain other accompanying drawings based on the accompanying drawings described below without creative efforts.

DETAILED DESCRIPTION

Figure 1:
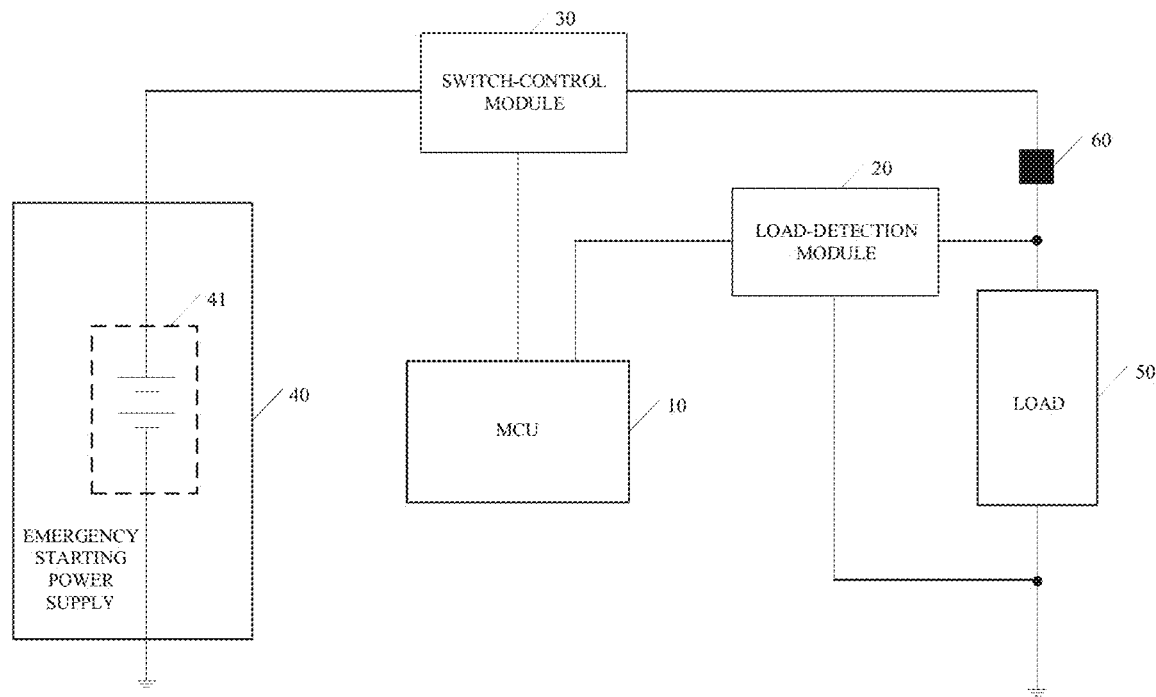
FIG. 1 is a schematic structural diagram illustrating an intelligent control system according to some implementations of the disclosure.

Hereinafter, technical solutions embodied by the implementations of the disclosure will be described in a clear and comprehensive manner with reference to the accompanying drawings intended for the implementations. It is evident that the implementations described herein constitute merely some rather than all the implementations of the disclosure, and that those of ordinary skill in the art will be able to derive other implementations based on these implementations without making creative efforts, which all such derived implementations shall all fall in the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

Implementations of the disclosure provide an intelligent control system, an emergency starting power supply, and an intelligent battery clip. Compared with a load-detection module including an isolated member, whether a load is in polarity reverse connection can be detected quickly in the disclosure. Upon detecting that the load is in polarity reverse connection, a microcontroller unit (MCU) controls a switch-control module to be in a disconnected state, which improves security and reliability of the control system.

Hereinafter, implementations of the disclosure will be described in detail.

According to implementations, an intelligent control system, an emergency starting power supply, and an intelligent battery clip are provided, which can quickly disconnect components in an output loop in the case of abnormal connection or reverse polarity input, thereby improving security and reliability of the control system.

According to implementations, an intelligent control system is provided. The intelligent control system includes a microcontroller unit (MCU), a load-detection module (or can be referred to as a voltage-detection module), a switch-control module, an emergency starting power supply, a load, and a power-supply output port. The power-supply output port is electrically coupled with the load. The switch-control module includes a first terminal coupled with an internal battery pack of the emergency starting power supply, a second terminal electrically coupled with the load via the power-supply output port, and a control terminal configured to receive a control signal from the MCU. The load-detection module is configured to detect a state of the load and includes a non-isolated member. The MCU is configured to control, according to the state of the load, the switch-control module to be in a switched-on state or a switched-off state.

In one implementation, the load-detection module configured to detect the state of the load is configured to: perform a polarity-connection identification on the load. The MCU configured to control, according to the state of the load, the switch-control module to be in the switched-on state or the switched-off state is configured to: control the switch-control module to be in the switched-off state when the load-detection module detects that the load is in polarity reverse connection.

In one implementation, the load-detection module is further configured to detect a voltage of the load.

In one implementation, the load-detection module includes a voltage proportion-operation circuit and a filter circuit.

In one implementation, the voltage proportion-operation circuit includes a first resistor, a second resistor, a third resistor, and a first diode. The filter circuit includes a fourth resistor and a first capacitor.

In one implementation, a first terminal of the first resistor is coupled with a power supply. A first terminal of the third resistor is coupled with a first terminal of the load. A second terminal of the first resistor is coupled with a first terminal of the second resistor, a second terminal of the third resistor, a first terminal of the fourth resistor, and a cathode of the first diode. A second terminal of the fourth resistor is coupled with a first terminal of the first capacitor and a first input terminal of the MCU. A second terminal of the second resistor, an anode of the first diode, and a second terminal of the first capacitor are grounded.

In one implementation, the MCU is configured to receive, with the first input terminal of the MCU, an analog voltage signal. The MCU is further configured to determine that the load is in polarity reverse connection when a voltage of the analog voltage signal is lower than a lower limit of a first voltage interval, and control the switch-control module to be in the switched-off state. The MCU is further configured to determine a voltage of the load according to the analog voltage signal.

In one implementation, the MCU is further configured to determine that the load is in polarity positive connection when the voltage of the analog voltage signal is higher than an upper limit of the first voltage interval.

In one implementation, the MCU is further configured to control the switch-control module to be in the switched-on state when a descending slope of the voltage of the analog voltage signal is greater than a preset slope threshold, based on a determination that the load is in polarity positive connection.

In one implementation, the MCU is further configured to determine that positive and negative poles of the load are short-circuited when the voltage of the analog voltage signal is within the first voltage interval, and control the switch-control module to be in the switched-off state.

In one implementation, the MCU is further configured to determine that an electrical connection between the power-supply output port and the load is abnormal when the voltage of the analog voltage signal is within a second voltage interval, where the first voltage interval does not intersect the second voltage interval.

In one implementation, the load-detection module includes a polarity-detection circuit and a voltage-detection circuit.

In one implementation, the polarity-detection circuit includes a fifth resistor, a sixth resistor, a seventh resistor, an eighth resistor, a ninth resistor, a second capacitor, and a second diode. The voltage-detection circuit includes a tenth resistor, an eleventh resistor, a twelfth resistor, a third capacitor, and a third diode.

In one implementation, a first terminal of the fifth resistor is coupled with a power supply. A second terminal of the fifth resistor is coupled with a first terminal of the sixth resistor, a first terminal of the eighth resistor, and a first terminal of the ninth resistor. A second terminal of the eighth resistor is coupled with a first terminal of the second capacitor and an output terminal of the polarity-detection circuit. A second terminal of the ninth resistor is coupled with a first terminal of the seventh resistor and an anode of the second diode. A cathode of the second diode is coupled with a first terminal of the load and a first terminal of the eleventh resistor. A second terminal of the eleventh resistor is coupled with a first terminal of the tenth resistor and a first terminal of the twelfth resistor. A second terminal of the twelfth resistor is coupled with a first terminal of the third capacitor and an output terminal of the voltage-detection circuit. A second terminal of the sixth resistor, a second terminal of the seventh resistor, a second terminal of the tenth resistor, a second terminal of the second capacitor, and a second terminal of the third capacitor are grounded.

In one implementation, the MCU is configured to receive, with a second input terminal of the MCU, a polarity voltage signal outputted by the output terminal of the polarity-detection circuit. The MCU is further configured to determine that the load is in polarity reverse connection when a voltage of the polarity voltage signal is within a third voltage interval, and control the switch-control module to be in the switched-off state.

In one implementation, the MCU is further configured to determine that the load is in polarity positive connection when the voltage of the polarity voltage signal is within a fourth voltage interval, wherein the third voltage interval does not intersect the fourth voltage interval.

In one implementation, the MCU is further configured to receive, with a third input terminal of the MCU, a voltage signal of the load outputted by the output terminal of the voltage-detection circuit based on a determination that the load is in polarity positive connection, and determine a voltage of the load according to the voltage signal of the load.

In one implementation, the load-detection module includes a first switch, a second switch, a third switch, a fourth switch, and a load resistor.

In one implementation, a first terminal of the first switch and a first terminal of the fourth switch are coupled with a first terminal of the load. A first terminal of the second switch and a first terminal of the third switch are coupled with a second terminal of the load. A second terminal of the first switch and a second terminal of the second switch are coupled with a positive pole of the internal battery pack. A second terminal of the third switch and a second terminal of the fourth switch are coupled with a first terminal of the load resistor. A second terminal of the load resistor is coupled with a negative pole of the internal battery pack.

In one implementation, the MCU is further configured to detect a first current on the load resistor when the first switch and the third switch are switched on and the second switch and the fourth switch are switched off. The MCU is further configured to detect a second current on the load resistor when the first switch and the third switch are switched off and the second switch and the fourth switch are switched on. The MCU is further configured to determine that the load is in polarity reverse connection when the first current is larger than the second current. The MCU is further configured to determine that the load is in polarity positive connection when the first current is smaller than the second current.

In one implementation, the load-detection module further includes a fifth switch and a sixth switch, where a first terminal of the fifth switch is coupled with the first terminal of the load, and a second terminal of the fifth switch is coupled with the positive pole of the internal battery pack; a first terminal of the sixth switch is coupled with the second terminal of the load, and a second terminal of the sixth switch is coupled with the negative pole of the internal battery pack.

In one implementation, the intelligent control system further includes a wake-up module. The wake-up module is configured to transmit an interrupt signal from an output terminal of the wake-up module to the MCU when the voltage of the load is higher than a first threshold, where the interrupt signal is used for switching the MCU from a sleep state or a standby state to a normal working state.

In one implementation, the wake-up module includes a first voltage comparator, a second voltage comparator, a fourth diode, a fifth diode, and a thirteenth resistor, where a power supply is coupled with a power supply terminal of the first voltage comparator, a power supply terminal of the second voltage comparator, and a first terminal of the thirteenth resistor, and a ground terminal of the first voltage comparator and a ground terminal of the second voltage comparator are grounded; a non-inverting input terminal of the first voltage comparator is coupled with a transmission line for transmitting a first reference voltage, an inverting input terminal of the first voltage comparator is coupled with a transmission line for transmitting an analog voltage signal or a voltage signal of the load, an output terminal of the first voltage comparator is coupled with a cathode of the fourth diode, and an anode of the fourth diode is coupled with a second terminal of the thirteenth resistor, an anode of the fifth diode, and the output terminal of the wake-up module; a non-inverting input terminal of the second voltage comparator is coupled with a transmission line for transmitting the analog voltage signal or the voltage signal of the load, an inverting input terminal of the second voltage comparator is coupled with a transmission line for transmitting a second reference voltage, and an output terminal of the second voltage comparator is coupled with a cathode of the fifth diode.

In one implementation, the intelligent control system further includes a regulated power-supply module. The regulated power-supply module includes a sixth diode, a seventh diode, and a low-dropout (LDO) regulator, where an anode of the sixth diode is coupled with a positive pole of the internal battery pack, a cathode of the sixth diode is coupled with a cathode of the seventh diode and an input terminal of the LDO regulator, and an anode of the seventh diode is coupled with a positive pole of the load, wherein an output terminal of the LDO regulator is a power supply.

In one implementation, the intelligent control system further includes a key input module. The key input module is configured to transmit an interrupt signal to the MCU when the key input module receives a key activation signal, where the interrupt signal is used for switching the MCU from a sleep state or a standby state to a normal working state.

In one implementation, the intelligent control system further includes a current detector. The current detector is arranged between the power-supply output port and the load and configured to detect a discharge current of the internal battery pack when the internal battery pack discharges to the load. When the discharge current is larger than an overcurrent threshold or the current detector transmits a short-circuit protection signal to the MCU when the discharge current is larger than a short circuit threshold, the current detector transmits an overcurrent protection signal to the MCU. The MCU is configured to control the switch-control module to be in the switched-off state according to at least one of the overcurrent protection signal and the short-circuit protection signal.

In one implementation, the intelligent control system further includes a bidirectional current detection sensor. The bidirectional current detection sensor is arranged between the power-supply output port and the load and configured to detect whether the internal battery pack is in a discharging state or a charging state. When the internal battery pack is in the charging state, the bidirectional current detection sensor transmits a charging protection signal to the MCU. The MCU is configured to control the switch-control module to be in the switched-off state according to the charging protection signal.

In one implementation, the intelligent control system further includes a state indicating module. The state indicating module is coupled with the MCU to realize state indication of the intelligent control system, where the state indication includes a working-state indication and an alarm prompt.

In one implementation, the load is a capacitive load.

In one implementation, the capacitive load comprises any one or any combination of a battery, a super capacitor, and a lithium battery.

According to implementations, an emergency starting power supply is provided. The emergency starting power supply includes an MCU, an internal battery pack, a switch-control module, and a load-detection module. The switch-control module includes a first terminal electrically coupled with the internal battery pack, a second terminal electrically coupled with a load, and a control terminal configured to receive a control signal from the MCU. The load-detection module is configured to detect a state of the load, where the load-detection module includes a non-isolated member. The MCU is configured to control, according to the state of the load, the switch-control module to be in a switched-on state or a switched-off state.

According to implementations, an intelligent battery clip is provided. The intelligent battery clip includes an MCU, a power-supply input port, a power-supply output port, a switch-control module, a load-detection module. The power-supply input port is electrically coupled with an internal battery pack of an emergency starting power supply. The power-supply output port is electrically coupled with a load. The switch-control module includes a first terminal electrically coupled with the internal battery pack via the power-supply input port, a second terminal electrically coupled with the load via the power-supply output port, and a control terminal configured to receive a control signal from the MCU. The load-detection module is configured to detect a state of the load, where the load-detection module includes a non-isolated member. The MCU is configured to control, according to the state of the load, the switch-control module to be in a switched-on state or a switched-off state.

According to the intelligent control system of the implementations of the disclosure, the load-detection module including the non-isolated member can perform a polarity-connection identification on the load and detect the voltage of the load. Compared with a load-detection module including an isolated member, the load-detection module of the disclosure can quickly determine whether the load is in polarity reverse connection. In the case of detecting that the load is in polarity reverse connection, the MCU can control the switch-control module to be in a switched-off state and can quickly disconnect the components in the output loop. In this way, the security and reliability of the control system can be improved.

Referring to FIG. 1, FIG. 1 is a schematic structural diagram illustrating an intelligent control system according to some implementations of the disclosure. As illustrated in FIG. 1, the intelligent control system of the implementations includes an MCU 10, a load-detection module 20, a switch-control module 30, an emergency starting power supply 40, a load 50, and a power-supply output port 60. The power-supply output port 60 is electrically coupled with the load 50. A first terminal of the switch-control module 30 is coupled with an internal battery pack 41 of the emergency starting power supply 40. A second terminal of the switch-control module 30 is electrically coupled with the load 50 via the power-supply output port 60. A control terminal of the switch-control module 30 is configured to receive a control signal from the MCU 10. The load-detection module 20 is configured to perform a polarity-connection identification on the load 50, where the load-detection module 20 includes a non-isolated member. The MCU 10 is configured to control the switch-control module 30 to be in a switched-off state when the load-detection module 20 detects that the load 50 is in polarity reverse connection.

In one implementation, the load-detection module 20 is further configured to detect a voltage of the load 50.

The intelligent control system of implementations of the disclosure is configured to detect whether the load 50 is in polarity reverse connection, and further configured to detect the voltage of the load 50.

The load 50 may be a capacitive load and include any one or any combination of an automobile storage battery (also known as an "automotive battery"), a super capacitor, and a lithium battery. The automobile storage battery can also be referred to as a car battery. The automobile storage battery may include a conventional lead-acid battery. When the load is in polarity reverse connection, damage to a current loop where the load is located may occur (e.g., burn out components in the loop, cause damage to the internal battery pack 41 of the emergency starting power supply 40, and so on).

The automobile storage battery can provide a strong starting current to a starter (e.g., a car motor) to start an engine when the car starts the engine. After the engine of the car is started, a generator of the car can be driven to start. The generator can supply power to all electrical equipment in the car (e.g., an in-car air conditioner, an audio, a cigarette lighter, a wiper, etc.) except the starter. When the generator is overloaded, the automobile storage battery can also assist the generator to supply power to the electrical equipment. When the engine is idling, the automobile storage battery can also supply power to electrical equipments. The generator can also charge the automobile storage battery.

The switch-control module 30 may be any one of a power electronic switch, a relay, and a field effect transistor (FET). The FET may include a metal-oxide-semiconductor field-effect transistor (MOSFET). The switch-control module 30 may be switched on at a high level and switched off at a low level. When the switch-control module 30 is switched on, the internal battery pack 41 of the emergency starting power supply 40 is electrically coupled with the load 50 via the power-supply output port 60. In this case, the internal battery pack 41 can provide energy to the load 50. When the switch-control module 30 is switched off, the internal battery pack 41 of the emergency starting power supply 40 is disconnected from the load 50. If the load-detection module 20 detects that the load 50 is in polarity reverse connection, the MCU 10 controls the switch-control module 30 to be in a switched-off state, to avoid damage to the entire control system.

The emergency starting power supply 40, also known as a car emergency starting power supply, is a multifunctional portable mobile power supply developed for users who drive. The emergency starting power supply 40 can serve as a backup power supply to start the car when the automobile storage battery is running low (i.e., a flatten battery) or the car cannot be started due to other reasons.

The emergency starting power supply 40 may include an internal battery pack 41. The internal battery pack 41 may be a lead-acid battery or a lithium polymer battery (e.g., a lithium battery). The emergency starting power supply 40 can provide energy supplement to the automobile storage battery, and can also be directly used for energy output required when a car engine starts.

The power-supply output port 60 is electrically coupled with the load 50. When capacity (i.e. power) of the load 50 is insufficient, the internal battery pack 41 can charge the load 50 via the power-supply output port 60. When the car is started, the load 50 can also be charged by the generator of the car. When capacity of the internal battery pack 41 is insufficient, the internal battery pack 41 can also be charged by the generator of the car. The load 50 and internal battery pack 41 can also be charged by the generator of the car at the same time.

The power-supply output port 60 may correspond to a clip of a battery clip (including a positive polarity clip and a negative polarity clip of the battery clip).

The non-isolated member herein refers to a member without an isolated sensor, and the isolated sensor may include a photocoupler.

According to the intelligent control system of the implementations of the disclosure, the load-detection module including the non-isolated member can perform polarity-connection identification on the load and detect the voltage of the load. Compared with a load-detection module including an isolated member, the load-detection module of the disclosure can quickly determine whether the load is in polarity reverse connection. In the case of detecting that the load is in polarity reverse connection, the MCU controls the switch-control module to be in the switched-off state. In this way, security and reliability of the control system can be improved.

The load-detection module 20 is configured to perform a polarity-connection identification on the load 50 and further configured to detect the voltage of the load 50.

Figure 2:
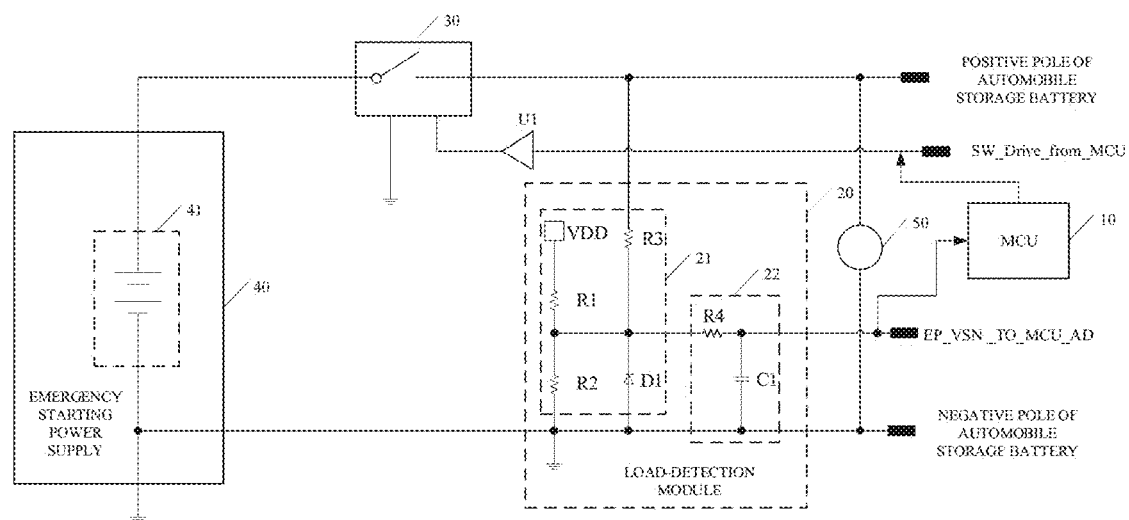
FIG. 2 is a schematic structural diagram illustrating a load-detection module according to some implementations of the disclosure.

Referring to FIG. 2, FIG. 2 is a schematic structural diagram illustrating a load-detection module according to some implementations of the disclosure. As illustrated in FIG. 2, the load-detection module 20 includes a voltage proportion-operation circuit 21 and a filter circuit 22. The voltage proportion-operation circuit 21 includes a first resistor R1, a second resistor R2, a third resistor R3, and a first diode D1. The filter circuit 22 includes a fourth resistor R4 and a first capacitor C1. A first terminal of the first resistor R1 is coupled with a power supply VDD. A first terminal of the third resistor R3 is coupled with a first terminal of the load 50. A second terminal of the first resistor R1 is coupled with a first terminal of the second resistor R2, a second terminal of the third resistor R3, a first terminal of the fourth resistor R4, and a cathode of the first diode D1. A second terminal of the fourth resistor R4 is coupled with a first terminal of the first capacitor C1 and a first input terminal of the MCU 10. A second terminal of the second resistor R2, an anode of the first diode D1, and a second terminal of the first capacitor C1 are grounded.

In this implementation, the voltage proportion-operation circuit 21 (including R1, R2, R3, and D1) and a low-pass filter circuit 22 (including R4 and C1) work together to perform polarity-connection identification on the load 50 and detect the voltage of the load 50 when the load 50 is coupled with the power-supply output port.

In the following, take an automobile storage battery (or can be referred to as a car battery) as an example of the load 50 in FIG. 2 for illustration.

The MCU 10 is configured to receive, with the first input terminal of the MCU 10, an analog voltage signal (i.e., EP_VSN_TO_MCU_AD illustrated in FIG. 2). The MCU 10 is further configured to determine that the load 50 is in polarity reverse connection when a voltage of the analog voltage signal is lower than a lower limit of a first voltage interval, and control the switch-control module 30 to be in the switched-off state. The MCU 10 receives the analog voltage signal EP_VSN_TO_MCU_AD through the first input terminal (e.g., an A/D input port) of the MCU 10. Then, according to a result of analog-to-digital (A/D) conversion and a mathematical operation, the MCU 10 determines whether the car battery is in correct polarity connection and accurately obtains a voltage of the car battery. If a voltage of the analog voltage signal EP_VSN_TO_MCU_AD after the A/D conversion is lower than the lower limit of the first voltage interval, it is determined that the load 50 is in polarity reverse connection. If the voltage of the analog voltage signal EP_VSN_TO_MCU_AD after A/D conversion is higher than an upper limit of the first voltage interval, it is determined that the load 50 is in polarity positive connection.

As an example, the first voltage interval is set to be in a range of 1 to 1.15V, the upper limit of the first voltage interval is 1.15V, and the lower limit of the first voltage interval is 1V. The voltage interval is set to be relatively narrow, which is beneficial to avoiding misjudgment due to relatively low detection accuracy (i.e., relatively high detection error).

Specifically, when the MCU 10 determines that the load 50 is in polarity reverse connection, the MCU 10 sends a close signal (i.e., SW_Drive_from_MCU illustrated in FIG. 2) to a driver U1, and controls, with the driver U1, the switch-control module 30 to be in the switched-off state. The driver U1 may be a direct current-direct current (DC-DC) driver. The driver U1 is configured to drive the switch-control module 30 to be in the switched-off state or a switched-on state. For instance, if the SW_Drive_from_MCU sent by the MCU 10 to the driver U1 is a low-level pulse, the driver U1 drives the switch-control module 30 to be in the switched-off state. If the SW_Drive_from_MCU sent by the MCU 10 to the driver U1 is a high-level pulse, the driver U1 drives the switch-control module 30 to be in the switched-on state.

The MCU 10 is further configured to determine a voltage of the load 50 according to the analog voltage signal.

In implementations of the disclosure, a proportional coefficient exists between a magnitude of the analog voltage signal EP_VSN_TO_MCU_AD and the voltage of the load 50, and the proportional coefficient is related to R1, R2, and R3 of the voltage proportion-operation circuit 21. The MCU 10 can calculate the voltage of the load 50 according to a voltage (value) of the analog voltage signal and the proportional coefficient of the voltage proportion-operation circuit 21.

In one implementation, the MCU 10 is further configured to determine that the load 50 is in polarity positive connection, when the voltage of the analog voltage signal is higher than an upper limit of the first voltage interval.

In one implementation, based on a determination that the load 50 is in polarity positive connection, the MCU 10 is further configured to control the switch-control module 30 be in the switched-on state when a descending slope of the voltage of the analog voltage signal is greater than a preset slope threshold.

The implementations of the disclosure are described by taking a car battery as an example of the load 50. In a car battery ignition scenario, when the car battery is used for ignition to start a car engine, a voltage of the car battery drops rapidly, and so a descending slope of the voltage of the car battery is detected to be greater than a preset slope threshold. In this case, the MCU controls the switch-control module 30 to be in the switched-on state, and the car battery can be charged by the battery pack of the emergency starting power supply.

In one implementation, the MCU 10 is further configured to determine that positive and negative poles of the load 50 are short-circuited when the voltage of the analog voltage signal is within the first voltage interval, and control the switch-control module 30 is in the switched-off state.

In one implementation, the MCU 10 is further configured to determine that an electrical connection between the power-supply output port and the load 50 is abnormal when the voltage of the analog voltage signal is within a second voltage interval, where the first voltage interval does not intersect the second voltage interval.

As an example, the second voltage interval is set to be in a range of 1.2~1.35V. Similarly, the voltage interval is set to be relatively narrow, which is beneficial to avoiding misjudgment due to relatively low detection accuracy (i.e., relatively high detection error)

According to the load-detection module 20 of the implementations of the disclosure, by using the voltage proportion-operation circuit 21 and the filter circuit 22, the load-detection module can perform a polarity-connection identification on the load and detect the voltage of the load. Compared with a load-detection module including an isolated member, the load-detection module of the disclosure can quickly determine whether the load is in polarity reverse connection. In the case of detecting that the load is in polarity reverse connection, the MCU controls the switch-control module to be in the switched-off state. In this way, the security and reliability of the control system can be improved.

In the following, the principle of the load-detection module 20 is briefly described by taking a car battery as an example of the load 50.

When a positive pole of the car battery is coupled with a negative pole of the power-supply output port, and a negative pole of the car battery is coupled with a positive pole of the power-supply output port, a polarity reverse phenomenon occurs. The first diode D1 and the third resistor R3 form a discharging loop in the car battery. If a voltage drop of the second resistor R2 exceeds a turn-on voltage of the first diode D1, the voltage drop is negatively clamped near −0.7V.

Figure 3:
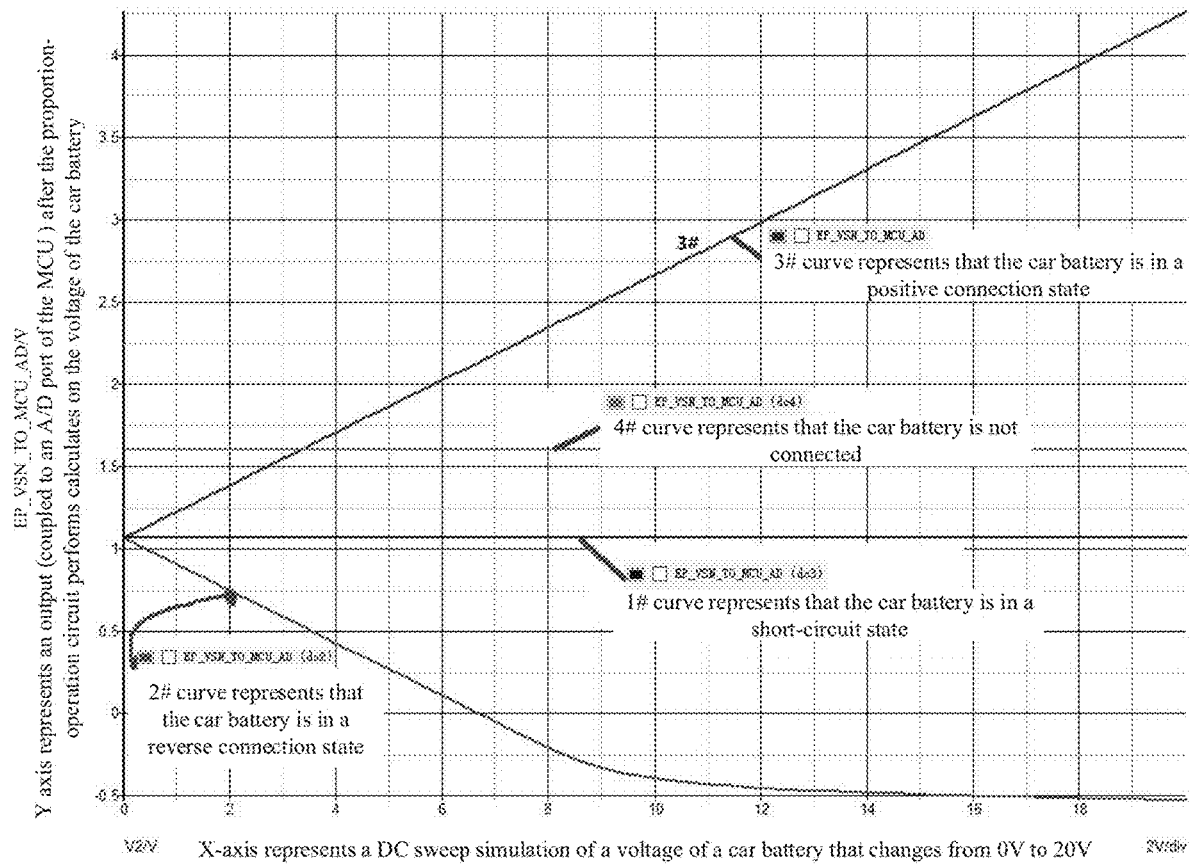
FIG. 3 is a schematic diagram of simulation results of a car battery in different states obtained by the load-detection module illustrated in FIG. 2 according to some implementations of the disclosure.

FIG. 3 is a schematic diagram of simulation results of a car battery in different states obtained by the load-detection module illustrated in FIG. 2 according to some implementations of the disclosure. As illustrated in FIG. 3, after a DC sweep simulation, X-axis represents a voltage of the car battery that changes from 0V to 20V, and Y-axis represents simulation results after the load-detection module 20 performs calculations on the voltage of the car battery, where the analog voltage signal is named EP_VSN_TO_MCU_AD, and the EP_VSN_TO_MCU_AD is electrically coupled with an A/D input port of the MCU (i.e., the first input terminal of the MCU). According to an A/D conversion result and a mathematical operation, the MCU determines whether the car battery is in correct polarity connection and accurately obtains the voltage of the car battery.

Referring to a 2 # simulation curve in FIG. 3, when the voltage of the analog voltage signal EP_VSN_TO_MCU_AD is lower than a preset threshold A, the MCU determines that the car battery and an output port of a product (e.g., an emergency starting power supply or intelligent battery clip) are in polarity reverse connection. In this case, an internal switch-control module is kept in an on state (i.e., a switched-on state), and starting a battery pack of the emergency starting power supply to supply output to the car battery is prohibited. The preset threshold A corresponding to the simulation result in FIG. 3 is 1.07V for example.

Referring to a 3 # simulation curve in FIG. 3, when the voltage of the analog voltage signal EP_VSN_TO_MCU_AD is higher than the preset threshold A, the MCU determines that the car battery and the output port of the product (e.g., an emergency starting power supply or intelligent battery clip) are in correct polarity connection (i.e., in polarity positive connection). Accordingly, the voltage signal EP_VSN_TO_MCU_AD coupled to the A/D port of the MCU (i.e., the first input terminal of the MCU) follows the voltage of the car battery ("battery voltage" for short) in a linear and proportional manner.

When in correct polarity connection, if the A/D input port of the MCU (i.e., the first input terminal of the MCU) detects that a descending slope of the battery voltage reaches to a set slope threshold, the MCU outputs an enable output signal to the switch-control module, so that the switch-control module enters the switched-on state, and the battery pack of the emergency starting power supply is started to output to the car battery.

Referring to a 4 # simulation curve in FIG. 3, when the voltage at the A/D input port of the MCU (i.e., the first input terminal of the MCU) is equal to a preset threshold B, the MCU determines that there is no electrical connection between the external car battery and the output port of the product (e.g., an emergency starting power supply or intelligent battery clip) or determines that there is no battery load inside the car. In this case, triggering the switch-control module to enter a switched-off state by externally and forcibly pressing a key is allowed, and so the battery pack of the emergency starting power supply is started to supply output to the car battery. The preset threshold B corresponding to the simulation result in FIG. 3 is 1.27V for example.

Referring to a 1 # simulation curve in FIG. 3, when the voltage at the A/D input port of the MCU (i.e., the first input terminal of the MCU) is equal to the preset threshold A, the MCU determines that positive and negative poles of the car battery are short-circuited. In this case, the switch-control module is controlled to enter the switched-off state, and the battery pack of the emergency starting power supply is not allowed to supply output to the car battery.

Figure 4:
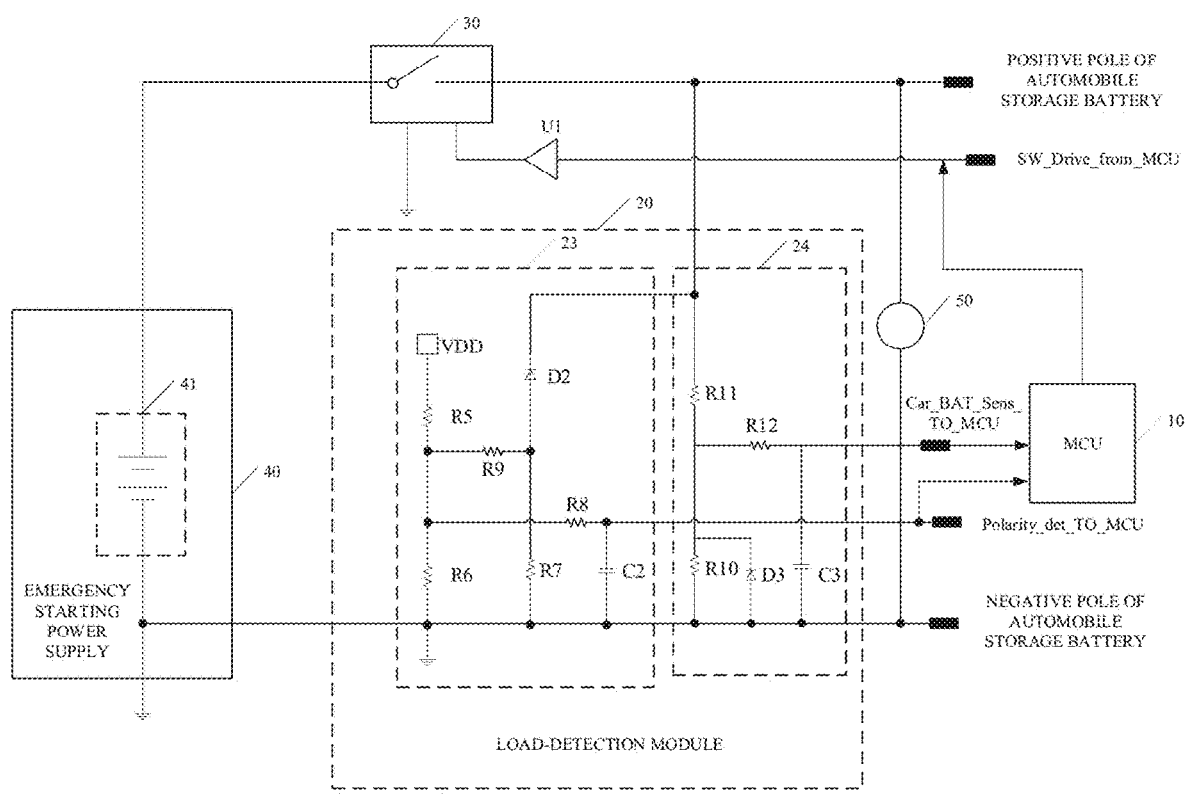
FIG. 4 is a schematic structural diagram illustrating a load-detection module according to other implementations of the disclosure.

FIG. 4 is a schematic structural diagram illustrating a load-detection module according to other implementations of the disclosure. As illustrated in FIG. 4, the load-detection module 20 includes a polarity-detection circuit 23 and a voltage-detection circuit 24. The polarity-detection circuit 23 includes a fifth resistor R5, a sixth resistor R6, a seventh resistor R7, an eighth resistor R8, a ninth resistor R9, a second capacitor C2, and a second diode D2. The voltage-detection circuit 24 includes a tenth resistor R10, an eleventh resistor R11, a twelfth resistor R12, a third capacitor C3, and a third diode D3. A first terminal of the fifth resistor R5 is coupled with a power supply VDD. A second terminal of the fifth resistor R5 is coupled with a first terminal of the sixth resistor R6, a first terminal of the eighth resistor R8, and a first terminal of the ninth resistor R9. A second terminal of the eighth resistor R8 is coupled with a first terminal of the second capacitor C2 and an output terminal of the polarity-detection circuit 23. A second terminal of the ninth resistor R9 is coupled with a first terminal of the seventh resistor R7 and an anode of the second diode D2. A cathode of the second diode D2 is coupled with a first terminal of the load 50 and a first terminal of the eleventh resistor R11. A second terminal of the eleventh resistor R11 is coupled with a first terminal of the tenth resistor R10 and a first terminal of the twelfth resistor R12. A second terminal of the twelfth resistor R12 is coupled with a first terminal of the third capacitor C3 and an output terminal of the voltage-detection circuit 24. A second terminal of the sixth resistor R6, a second terminal of the seventh resistor R7, a second terminal of the tenth resistor R10, a second terminal of the second capacitor C2, and a second terminal of the third capacitor C3 are grounded. The MCU 10 is configured to receive, with a second input terminal of the MCU 10, a polarity voltage signal outputted by the output terminal of the polarity-detection circuit 23 (i.e., Polarity_det_TO_MCU illustrated in FIG. 4). The MCU 10 is further configured to determine that the load 50 is in polarity reverse connection when a voltage of the polarity voltage signal is within a third voltage interval, and control the switch-control module 30 to be in the switched-off state.

As an example, the third voltage interval is set to be lower than 0.45V.

The fifth resistor R5, the sixth resistor R6, the seventh resistor R7, the ninth resistor R9, and the second capacitor C2 of the polarity-detection circuit 23 form a proportional voltage divider circuit. The eighth resistor R8 and the second diode D2 form a low-pass filter.

The tenth resistor R10, the third diode D3, and the eleventh resistor R11 of the voltage-detection circuit 24 form a proportional voltage divider circuit. D3 and R10 are connected in parallel, to ensure that a voltage received by a third input terminal of the MCU is not lower than −0.7V. The twelfth resistor R12 and the third capacitor C3 form another low-pass filter.

In one implementation, the MCU 10 is further configured to determine that the load 50 is in polarity positive connection when the voltage of the polarity voltage signal is within a fourth voltage interval, where the third voltage interval does not intersect the fourth voltage interval.

As an example, the fourth voltage interval is set to be in a range of 0.45~0.6V.

In one implementation, based on a determination that the load 50 is in polarity positive connection, the MCU 10 is further configured to receive, with a third input terminal of the MCU, a voltage signal of the load outputted by the output terminal of the voltage-detection circuit (i.e., Car_BAT_Sens_TO_MCU illustrated in FIG. 4). In the implementation of the disclosure, the load-detection module 20 is configured to determine a voltage of the load 50 according to the voltage signal of the load 50.

According to the load-detection module 20 of the implementations of the disclosure, the polarity-detection circuit 23 can perform a polarity-connection identification on the load, and the voltage-detection circuit 24 can detect the voltage of the load. Compared with a load-detection module including an isolated member, the load-detection module of the disclosure can quickly determine whether the load is in polarity reverse connection. In the case of detecting that the load is in polarity reverse connection, the MCU controls the switch-control module to be in a switched-off state. In this way, security and reliability of the control system can be improved.

In the following, the principle of the load-detection module 20 will be briefly described with reference to FIG. 4 by taking a car battery as an example of the load 50.

When the car battery is in polarity reverse connection, the (polarity) voltage signal Polarity_det_TO_MCU is lower than the set voltage threshold (e.g., 0.45V). When the car battery is in polarity positive connection, the (polarity) voltage signal Polarity_det_TO_MCU is within the fourth voltage range (e.g., 0.45~0.6V). The voltage signal Car_BAT_Sens_TO_MCU follows the voltage of the car battery in a linear and proportional manner.

Figure 5:
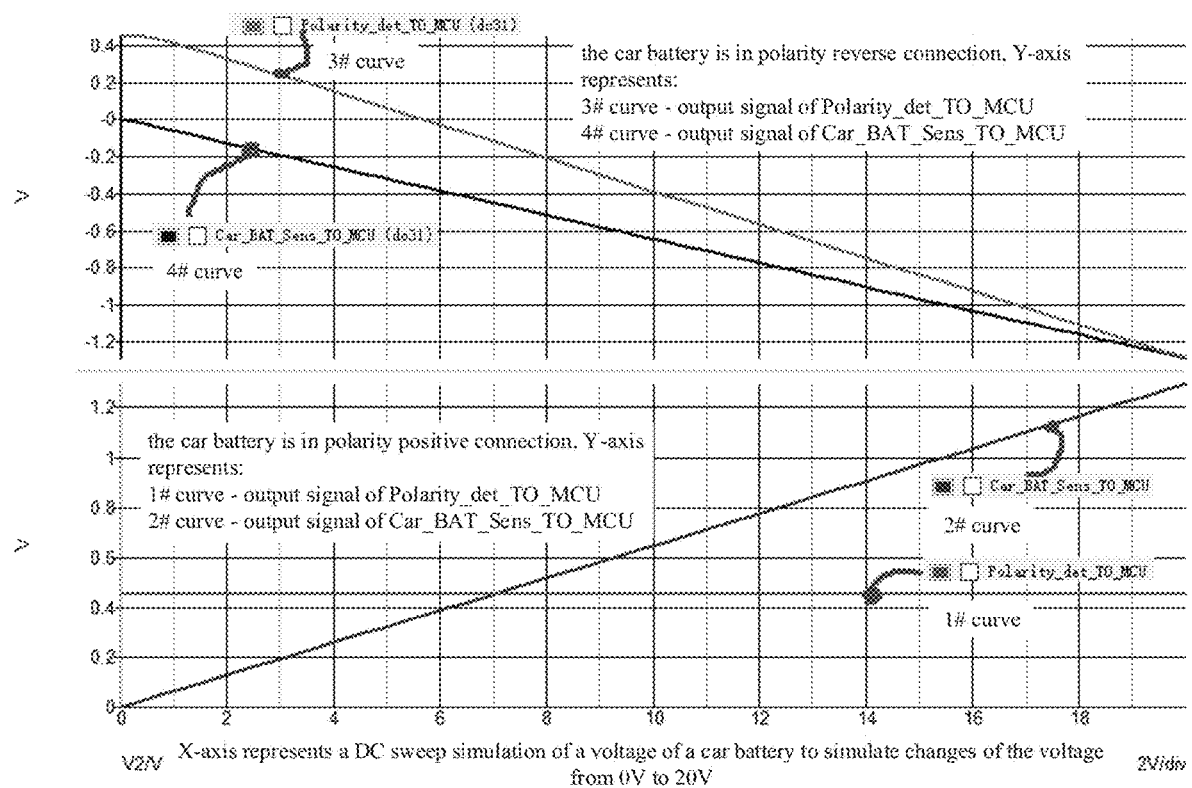
FIG. 5 is a schematic diagram of simulation results of a car battery in different states obtained by the load-detection module illustrated in FIG. 4 according to some implementations of the disclosure.

FIG. 5 is a schematic diagram of simulation results of a car battery in different states obtained by the load-detection module illustrated in FIG. 4 according to some implementations of the disclosure. As illustrated in FIG. 5, after a DC sweep simulation, X-axis represents a voltage of the car battery that changes from 0V to 20V, and Y-axis represents simulation results of the polarity voltage signal Polarity_det_TO_MCU and the voltage signal of the load Car_BAT_Sens_TO_MCU after the load-detection module 20 performs calculations on the voltage of the car battery, where Polarity_det_TO_MCU is electrically coupled with an A/D input port of the MCU (i.e., the second input terminal of the MCU), and Car_BAT_Sens_TO_MCU is electrically coupled with another A/D input port of the MCU (i.e., the third input terminal of the MCU), the MCU accurately obtains the voltage of the car battery according to the voltage signal of Car_BAT_Sens_TO_MCU and a mathematical operation.

Referring to a 1 # simulation curve in FIG. 5, when the voltage of the polarity voltage signal Polarity_det_TO_MCU is within a fourth voltage interval (e.g., 0.45~0.6V), the MCU determines that the car battery and an output port of a product (e.g., an emergency starting power supply or intelligent battery clip) are in correct polarity connection (i.e., in polarity positive connection).

Referring to a 2 # simulation curve in FIG. 5, when the car battery and the output port of the product (e.g., an emergency starting power supply or intelligent battery clip) are in polarity positive connection, the voltage signal Car_BAT_Sens_TO_MCU coupled with the A/D port of the MCU (i.e., the third input terminal of the MCU) follows the battery voltage in a linear and proportional manner.

Referring to a 3 # simulation curve in FIG. 5, when the voltage of the polarity voltage signal Polarity_det_TO_MCU is within a third voltage interval (e.g, lower than 0.45V), the MCU determines that the car battery and the output port of the product (e.g., an emergency starting power supply or intelligent battery clip) are in polarity reverse connection. The MCU keeps an internal switch-control module in a switched-off state, and a battery pack of the emergency starting power supply is not allowed to output to the car battery.

Referring to a 4 # simulation curve in FIG. 5, when the car battery and the output port of the product (e.g., an emergency starting power supply or intelligent battery clip) are in polarity reverse connection, the voltage signal Car_BAT_Sens_TO_MCU coupled with the A/D port of the MCU (i.e., the third input terminal of the MCU) follows the battery voltage in a linear and inversely proportional manner.

Figure 6:
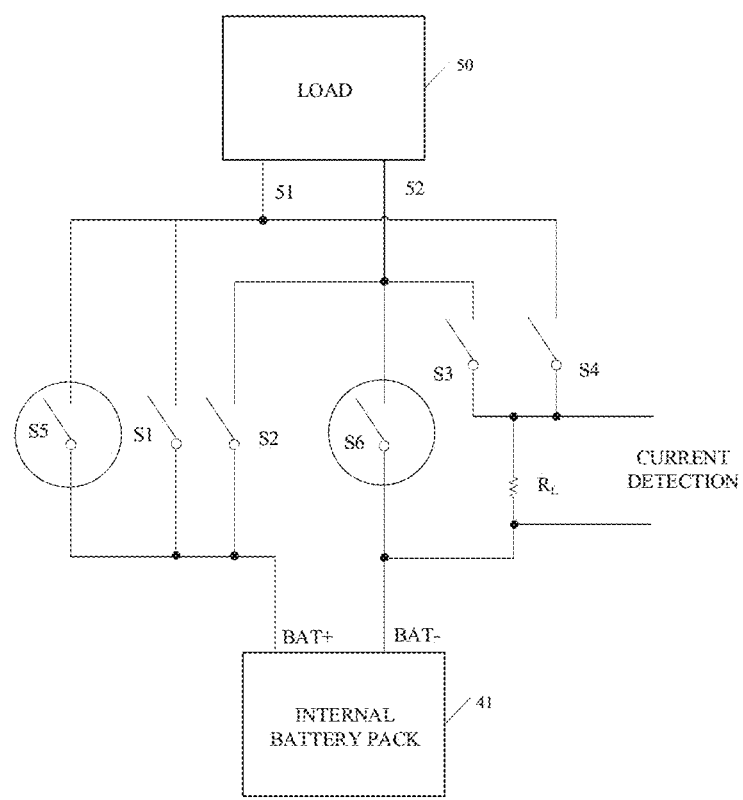
FIG. 6 is a schematic structural diagram illustrating a load-detection module according to other implementations of the disclosure.

Referring to FIG. 6, FIG. 6 is a schematic structural diagram illustrating a load-detection module according to other implementations of the disclosure. As illustrated in FIG. 6, the load-detection module includes a first switch S1, a second switch S2, and a third switch S3, a fourth switch S4, and a load resistor RL. A first terminal of the first switch S1 and a first terminal of the fourth switch S4 are coupled with a first terminal 51 of the load 50. A first terminal of the second switch S2 and a first terminal of the third switch S3 are coupled with a second terminal 52 of the load 50. A second terminal of the first switch S1 and a second terminal of the second switch S2 are coupled with a positive pole BAT+ of the internal battery pack 41. A second terminal of the third switch S3 and a second terminal of the fourth switch S4 are coupled with a first terminal of the load resistor RL, and a second terminal of the load resistor RL is coupled with a negative pole BAT− of the internal battery pack 41. The MCU 10 is further configured to detect a first current on the load resistor RL, when the first switch S1 and the third switch S3 are switched on and the second switch S2 and the fourth switch S4 are switched off. The MCU 10 is further configured to detect a second current on the load resistor RL, when the first switch S1 and the third switch S3 are switched off and the second switch S2 and the fourth switch S4 are switched on. The MCU 10 is further configured to determine that the load 50 is in polarity reverse connection when the first current is larger than the second current. The MCU 10 is further configured to determine that the load 50 is in polarity positive connection when the first current is smaller than the second current.

In one implementation, as illustrated in FIG. 6, the load-detection module further includes a fifth switch S5 and a sixth switch S6. The fifth switch S5 and the sixth switch S6 electrically coupled between the internal battery pack 41 and the load 50 are served as the switch-control module for controlling power output of the internal battery pack 41. A first terminal of the fifth switch S5 is coupled with the first terminal 51 of the load 50. A second terminal of the fifth switch S5 is coupled with the positive pole BAT+ of the internal battery pack 41. A first terminal of the sixth switch S6 is coupled with the second terminal 52 of the load 50. A second terminal of the sixth switch S6 is coupled with the negative pole BAT− of the internal battery pack 41.

The implementations of the disclosure are described by taking a car battery as an example of the load 50.

S5 and S6 are high-power electronic switches, which are in a switched-off state when not igniting. S1, S2, S3, and S4 are low-power electronic switches. By controlling switching between the switched-on state and switched-off state of S1-S4, currents on RL of different loops are compared to determine whether the internal battery pack 41 and the car battery are in polarity reverse connection or in polarity positive connection.

Specifically, when the low-power electronic switches S1 and S3 are switched on (conducted) and the low-power electronic switches S2 and S4 are switched off, the MCU detects a current $I_1$ on the load resistor RL. In this case, a current loop in FIG. 6 includes the first terminal 51 of the car battery 50, S1, BAT+, BAT−, RL, S3, and the second terminal 52 of the car battery 50. When the low-power electronic switches S2 and S4 are switched on (conducted) and the low-power electronic switches S1 and S3 are switched off, the MCU detects a current $I_2$ on the load resistor RL. In this case, a current loop in FIG. 6 includes BAT+, S2, the second terminal 52 of the car battery 50, the first terminal 51 of the car battery 50, S4, RL, BAT−.

When I1<I2, it means that the internal battery pack 41 and the car battery are in polarity positive connection. In this case, the first terminal 51 of the car battery 50 is a positive pole of the car battery 50, and the second terminal 52 of the car battery 50 is a negative pole of the car battery 50. When I1>I2, it means that the internal battery pack 41 and the car battery are in polarity reverse connection. When I1=I2=0, it means that the car battery is not coupled with the internal battery pack 41. In this case, the first terminal 51 of the car battery 50 is the negative pole of the car battery 50, and the second terminal 52 of the car battery 50 is the positive pole of the car battery 50.

According to the implementations of the disclosure, the load-detection module (including the first switch S1, the second switch S2, the third switch S3, the fourth switch S4, and the load resistor RL) can perform a polarity-connection identification on the load. Compared with a load-detection module including an isolated member, the load-detection module of the disclosure can quickly determine whether the load is in polarity reverse connection. In the case of detecting that the load is in polarity reverse connection, the MCU controls the switch-control module to be in a switched-off state. In this way, the security and reliability of the control system can be improved.

Figure 7:
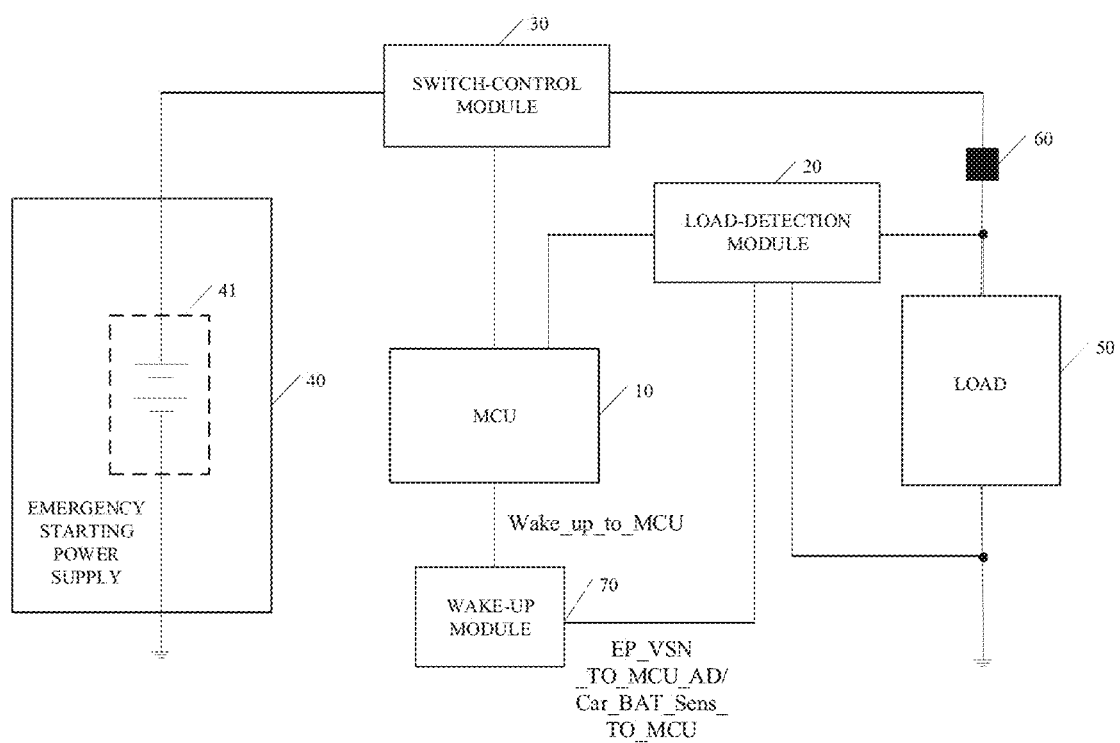
FIG. 7 is a schematic structural diagram illustrating an intelligent control system according to other implementations of the disclosure.

Referring to FIG. 7, FIG. 7 is a schematic structural diagram illustrating an intelligent control system according to other implementations of the disclosure. FIG. 7 is a detailed diagram on the basis of FIG. 1. As illustrated in FIG. 7, the intelligent control system further includes a wake-up module 70. The wake-up module 70 is configured to transmit an interrupt signal from an output terminal of the wake-up module 70 to the MCU 10 when the voltage of the load 50 is detected to be higher than a first threshold, where the interrupt signal is used for switching the MCU 10 from a sleep state or a standby state to a normal working state.

Figure 8:
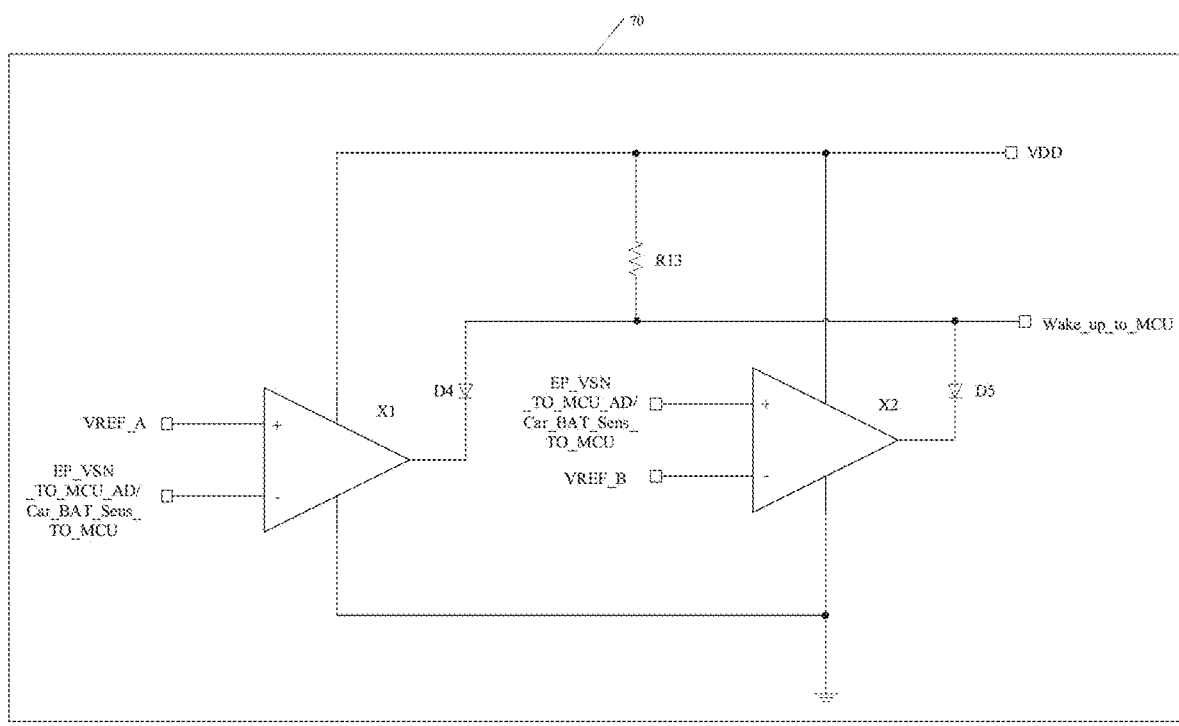
FIG. 8 is a schematic structural diagram illustrating a wake-up module according to some implementations of the disclosure.

In one implementation, as illustrated in FIG. 8, the wake-up module 70 includes a first voltage comparator X1, a second voltage comparator X2, a fourth diode D4, a fifth diode D5, and a thirteenth resistor R13. The power supply VDD is coupled with a power supply terminal of the first voltage comparator X1, a power supply terminal of the second voltage comparator X2, and a first terminal of the thirteenth resistor R13. A ground terminal of the first voltage comparator X1 and a ground terminal of the second voltage comparator X2 are grounded. A non-inverting input terminal of the first voltage comparator X1 is coupled with a transmission line for transmitting a first reference voltage VREF_A. An inverting input terminal of the first voltage comparator X1 is coupled with a transmission line for transmitting the analog voltage signal (e.g., EP_

VSN_TO_MCU_AD illustrated in FIG. 2) or the voltage signal of the load (e.g., Car_BAT_Sens_TO_MCU illustrated in FIG. 4). An output terminal of the first voltage comparator X1 is coupled with a cathode of the fourth diode D4. An anode of the fourth diode D4 is coupled with a second terminal of the thirteenth resistor R13, an anode of the fifth diode D5, and the output terminal of the wake-up module 70. A non-inverting input terminal of the second voltage comparator X2 is coupled with a transmission line for transmitting the analog voltage signal or the voltage signal of the load. An inverting input terminal of the second voltage comparator X2 is coupled with a transmission line for transmitting a second reference voltage VREF_B. An output terminal of the second voltage comparator X2 is coupled with a cathode of the fifth diode D5.

The first reference voltage VREF_A and the second reference voltage VREF_B may be equal or not equal.

The non-inverting input terminal of the second voltage comparator X2 and the inverting input terminal of the first voltage comparator X1 have a same input signal, the input signal may be EP_VSN_TO_MCU_AD in FIG. 2 or may be Car_BAT_Sens_TO_MCU in FIG. 4.

Taking a car battery as an example of the load, a voltage of the car battery is higher than a set first threshold (e.g., 5V). For a 12V car battery, if the voltage of the car battery is lower than 5V, it indicates that the car battery is probably unusable. In this situation, the MCU needs to be wakened up to further perform polarity detection and voltage detection on the car battery.

Figure 9:
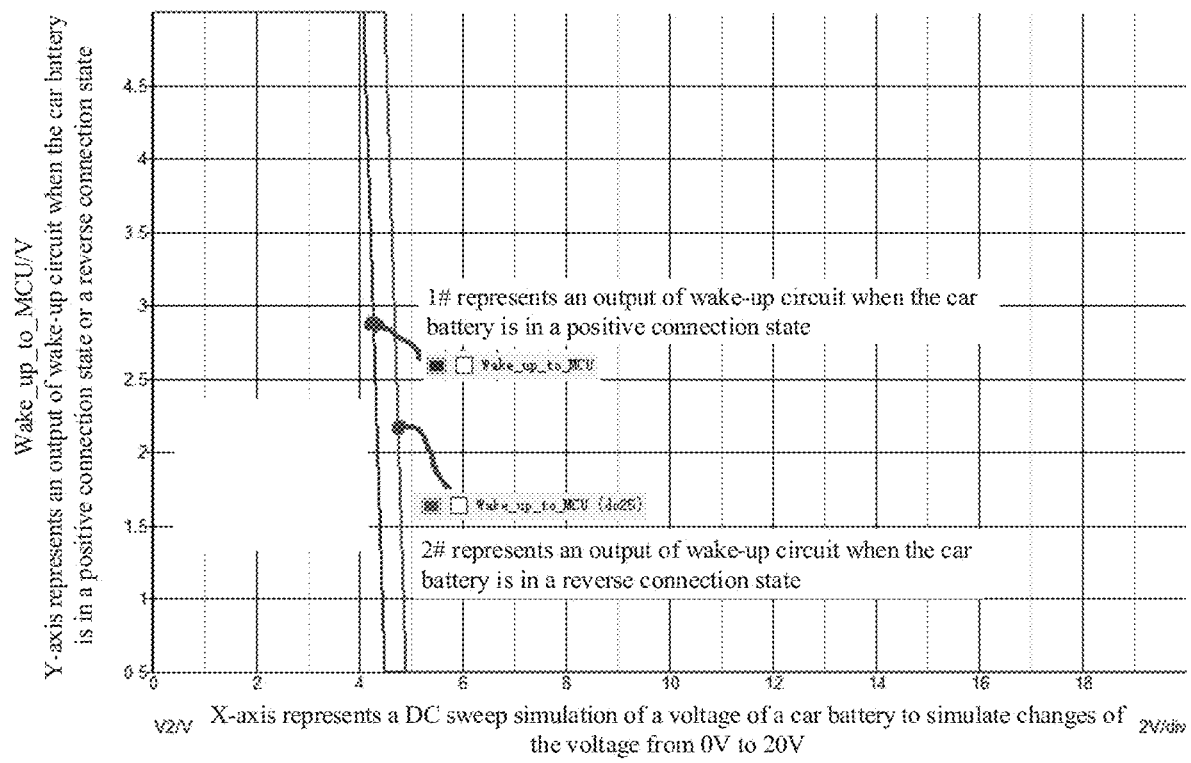
FIG. 9 is a schematic diagram of simulation results of a wake-up circuit according to some implementations of the disclosure.

FIG. 9 is a schematic diagram of simulation results of a wake-up circuit according to some implementations of the disclosure. As illustrated in FIG. 9, when the voltage of the car battery is higher than the set first threshold (e.g., 5V), no matter whether the car battery is in a positive connection state or a reverse connection state, the wake-up module 70 outputs a flat transition signal from a high level to a low level (i.e., Wake_up_to_MCU illustrated in FIG. 8) to an interrupt input port of the MCU, to wake up the MCU. It can be seen from FIG. 9 that the first reference voltage VREF_A and the second reference voltage VREF_B are set to be different.

Figure 10:
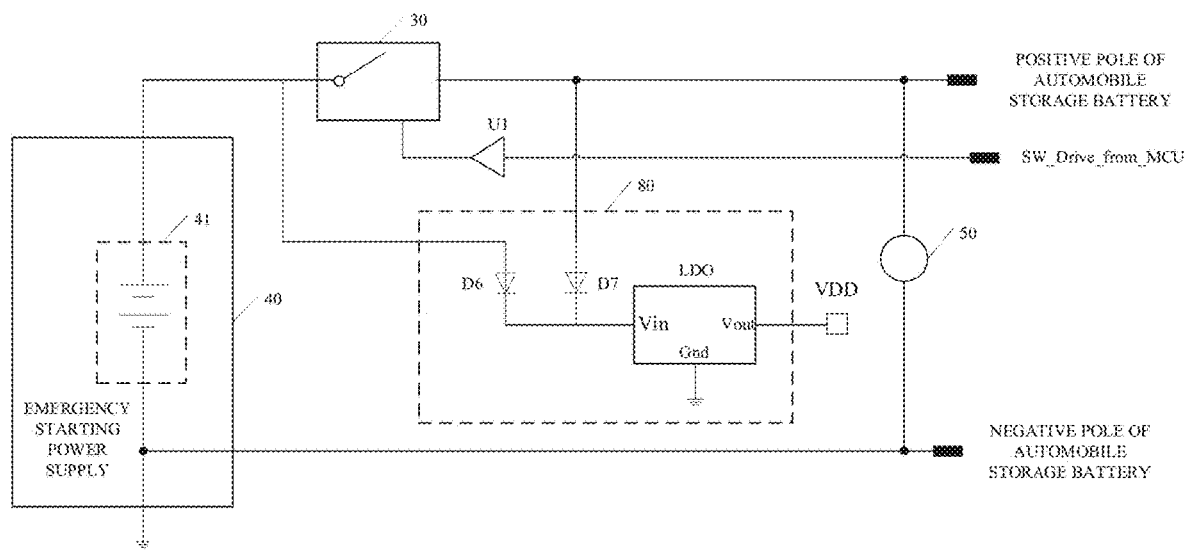
FIG. 10 is a schematic structural diagram illustrating a regulated power-supply module according to some implementations of the disclosure.

Referring to FIG. 10, FIG. 10 is a schematic structural diagram illustrating a regulated power-supply module according to some implementations of the disclosure. As illustrated in FIG. 10, a regulated power-supply module 80 includes a sixth diode D6, a seventh diode D7, and a low-dropout (LDO) regulator. An anode of the sixth diode D6 is coupled with a positive pole of the internal battery pack 41. A cathode of the sixth diode D6 is coupled with a cathode of the seventh diode D7 and an input terminal Vin of the LDO. An anode of the seventh diode D7 is coupled with a positive pole of the load 50. An output terminal Vout of the LDO is the power supply VDD.

When the regulated power-supply module 80 receives a correct DC voltage (input), and the regulated power-supply module 80 outputs a set accurate voltage to supply power to functional modules or related electronic components in the intelligent control system. An input of the regulated power-supply module 80 is coupled with the positive pole of the internal battery pack and the positive pole of the load. The regulated power-supply module 80 can provide stable VDD (e.g., 3.3V or 5V) for functional modules of the intelligent control system.

In one implementation, the intelligent control system further includes a key input module. When the key input module receives a key activation signal, the key input module transmits an interrupt signal to the MCU, where the interrupt signal is used for switching the MCU from a sleep state or a standby state to a normal working state.

The MCU is configured to receive the key activation signal from the key input module for level-triggered wake-up. After the MCU is activated, the MCU enters the normal working state, and outputs a state indication signal to a state indicating module.

In some scenarios, for example, when the voltage of the car battery is lower than 5V, the wake-up module 70 cannot work normally. In this case, a user can press the key input module, as such, the MCU can be switched from the sleep state or standby state to the normal working state through the key input module.

In one implementation, the intelligent control system further includes a current detector. The current detector is arranged between the power-supply output port and the load, and is configured to detect a discharge current of the internal battery pack when the internal battery pack discharges to the load. When the discharge current is larger than an overcurrent threshold, the current detector transmits an overcurrent protection signal to the MCU, or when the discharge current is larger than a short-circuit threshold, the current detector transmits a short-circuit protection signal to the MCU. The MCU is configured to control the switch-control module to be in the switched-off state according to at least one of the overcurrent protection signal and the short-circuit protection signal.

In the implementation of the disclosure, when the internal battery pack discharges to the car battery via the switched-on switch-control module, a discharged output current flows through the current detector (e.g., a current sense resistor or a conductor), a voltage of the current detector generated due to flowing of the current is amplified, and then the voltage is transmitted to the A/D input port of the MCU, to perform A/D conversion and a mathematical calculation, to indirectly obtain a discharged output current. The MCU compares an actual output current with a set threshold for an overcurrent state or a short-circuit state. If the actual output current is larger than the set threshold for the overcurrent state or the short-circuit state, the switch-control module is switched off to disconnect an output loop. In the implementation of the disclosure, by providing the current detector, the intelligent control system has a protection mechanism for output over-current and external load short-circuit.

In one implementation, the intelligent control system further includes a bidirectional current detection sensor. The bidirectional current detection sensor is arranged between the power-supply output port and the load, and configured to detect whether the internal battery pack is in a discharging state or a charging state. When the internal battery pack is in the charging state, the bidirectional current detection sensor transmits a charging protection signal to the MCU. The MCU is configured to control the switch-control module to be in the switched-off state according to the charging protection signal.

In the implementation of the disclosure, when an auxiliary start of a car is completed, an internal generator of the car starts to work. A voltage of an external car battery may be higher than a voltage of an internal battery of the emergency starting power supply. As a result, unsafe phenomenons of current backflow and recharging the internal battery occur. Since the engine is also equipped with a generator, once the engine is started, the engine and a motor rotate, and the generator is driven to start to generate electricity. In this case, the generator in turn charges the car battery and the internal battery, which is the current backflow. In the implementation of the disclosure, the bidirectional current detection sensor is used to detect a direction and a current value of the output current. The MCU is configured to receive an output from the bidirectional current detection sensor, and a normal start output corresponds to a discharging direction. If the detected direction of the current is a charging direction, the switch-control module is switched off to disconnect the output loop.

In one implementation, the intelligent control system further includes the state indicating module. The state indicating module is coupled with the MCU to realize state indication of the intelligent control system, where the state indication includes a working-state indication and an alarm prompt.

In the implementation of the disclosure, the state indicating module is formed by a light-emitting diode (LED) indicator or a combination of the LED indicator and a buzzer.

Generally, the foregoing intelligent control system includes an emergency starting power supply, a battery clip, and a load. The emergency starting power supply includes an internal battery pack. The battery clip includes a power-supply output port and a power-supply input port. The load may be an automobile storage battery (or can be referred to as a car battery), or the like. The power-supply input port of the battery clip is coupled with the internal battery pack, and the power-supply output port of the battery clip is coupled with the car battery. Specifically, a positive pole of the power-supply input port of the battery clip is coupled with a positive pole of the internal battery pack, and a negative pole of the power-supply input port of the battery clip is coupled with a negative pole of the internal battery pack. A positive pole of the power-supply output port of the battery clip corresponds to a positive pole clip of the battery clip (the positive pole clip is generally red), and a negative pole of the power-supply output port of the battery clip corresponds to a negative pole clip of the battery clip (the negative pole clip is generally black). Generally, the positive pole clip of the battery clip clamps a positive pole of the car battery, and the negative pole clip of the battery clip clamps a negative pole of the car battery. In this case, the positive pole of the power-supply output port of the battery clip is coupled with the positive pole of the car battery, the negative pole of the power-supply output port is coupled with the negative pole of the car battery, and the car battery is in polarity positive connection. In some cases, due to improper operation by the user or misoperation by unprofessional maintenance personnel, the positive pole clip of the battery clip clamps the negative pole of the car battery, and the negative pole clip of the battery clip clamps the positive pole of the car battery, which in turn causes the car battery to be in polarity reverse connection.

Figure 11:
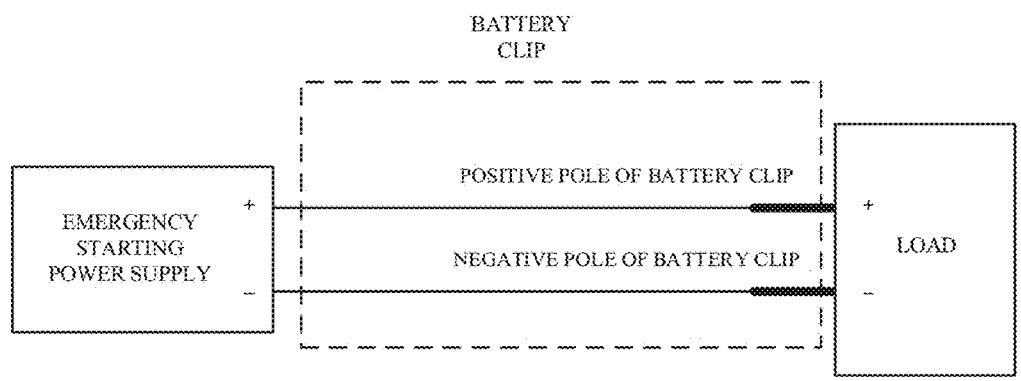
FIG. 11 is a schematic structural diagram illustrating an intelligent control system according to other implementations of the disclosure.

Referring to FIG. 11, FIG. 11 is a schematic structural diagram illustrating an intelligent control system according to other implementations of the disclosure. As illustrated in FIG. 11, the intelligent control system includes an emergency starting power supply, a battery clip, and a load. FIG. 11 illustrates that the battery clip and the load are in polarity positive connection.

Figure 12:
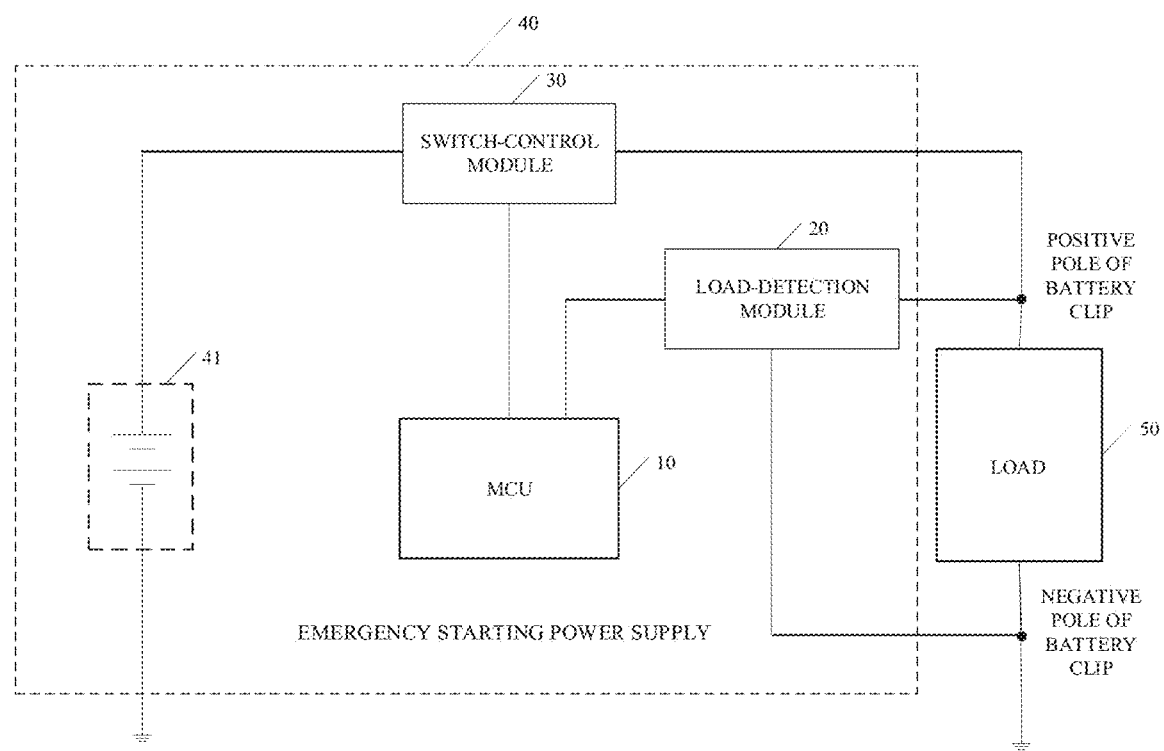
FIG. 12 is a schematic structural diagram illustrating an emergency starting power supply according to some implementations of the disclosure.
Figure 13:
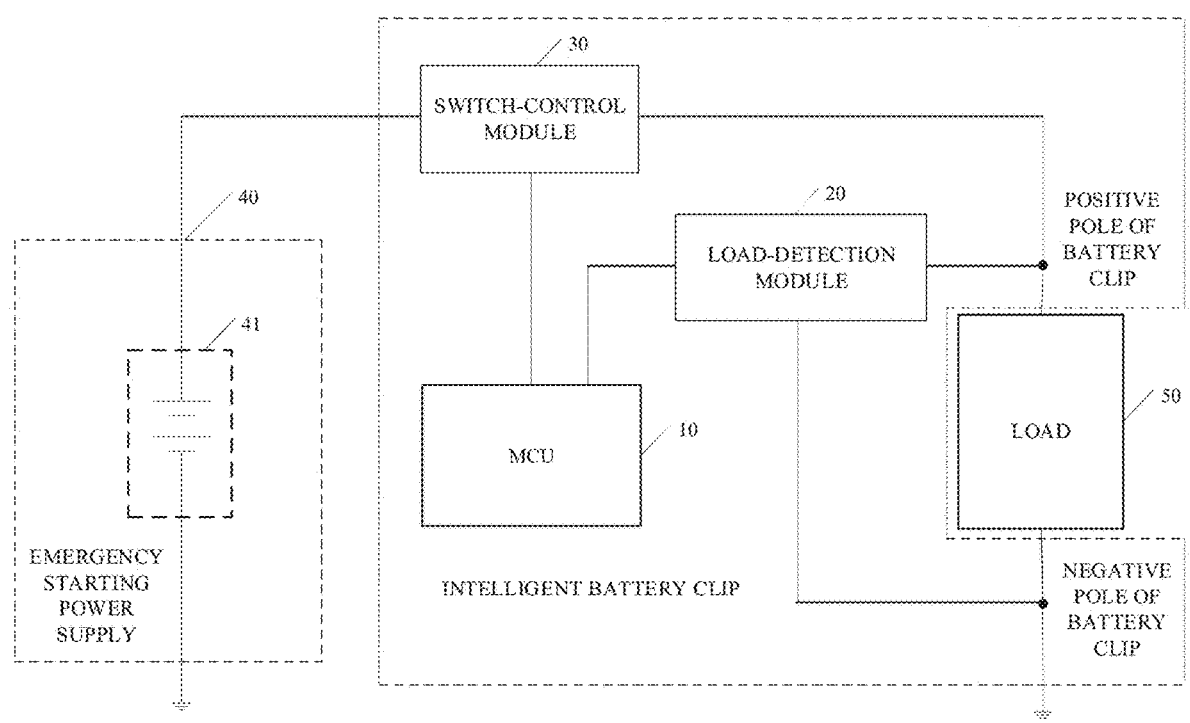
FIG. 13 is a schematic structural diagram illustrating an intelligent battery clip according to some implementations of the disclosure.

As illustrated in FIG. 12, the MCU, the load-detection module, and the switch-control module of the intelligent control system may be integrated with the emergency starting power supply. As illustrated in FIG. 13, the MCU, the load-detection module, and the switch-control module of the intelligent control system may also be integrated with a battery clip, in this case, the battery clip can be called an intelligent battery clip.

The control system, the emergency starting power supply, and the intelligent battery clip provided by the implementations of the disclosure have been described in detail above. While the principles and implementations of the disclosure have been described in connection with illustrative implementations, it is to be understood that foregoing implementations are only used to help understand the method and core idea of the disclosure. As will occur to those skilled in the art, the disclosure is susceptible to various modifications and changes without departing from the spirit and principle of the disclosure. Therefore, the disclosure is not to be limited to the disclosed implementations.

What is claimed is:

1. An intelligent control system, comprising:
   a microcontroller unit (MCU), a load-detection module, a switch-control module, an emergency starting power supply, a load, and a power-supply output port;
   the power-supply output port being electrically coupled with the load;
   the switch-control module comprising a first terminal coupled with an internal battery pack of the emergency starting power supply, a second terminal electrically coupled with the load via the power-supply output port, and a control terminal configured to receive a control signal from the MCU;
   the load-detection module being configured to detect a state of the load and comprising a non-isolated member;
   the MCU being configured to control, according to the state of the load, the switch-control module to be in a switched-on state or a switched-off state; and
   the intelligent control system further comprising a key input module configured to transmit an interrupt signal to the MCU when the key input module receives a key activation signal, wherein the interrupt signal is used for switching the MCU from a sleep state or a standby state to a normal working state.

2. An emergency starting power supply, comprising:
   a microcontroller unit (MCU);
   an internal battery pack;
   a switch-control module, comprising a first terminal electrically coupled with the internal battery pack, a second terminal electrically coupled with a load, and a control terminal configured to receive a control signal from the MCU; and
   a load-detection module, configured to detect a state of the load and comprising a non-isolated member; and
   wherein
   the MCU is configured to control, according to the state of the load, the switch-control module to be in a switched-on state or a switched-off state, and
   the load-detection module comprises a voltage proportion-operation circuit and a filter circuit.

3. The emergency starting power supply of claim 2, wherein
   the load-detection module configured to detect the state of the load is configured to:
      perform a polarity-connection identification on the load; and
   the MCU configured to control, according to the state of the load, the switch-control module to be in the switched-on state or the switched-off state is configured to:
      control the switch-control module to be in the switched-off state when the load-detection module detects that the load is in polarity reverse connection.

4. The emergency starting power supply of claim 2, wherein the load-detection module is further configured to detect a voltage of the load.

5. The emergency starting power supply of claim 4, further comprising:
a wake-up module, configured to transmit an interrupt signal from an output terminal of the wake-up module to the MCU when the voltage of the load is higher than a first threshold, wherein the interrupt signal is used for switching the MCU from a sleep state or a standby state to a normal working state.

6. The emergency starting power supply of claim 5, wherein
the wake-up module comprises a first voltage comparator, a second voltage comparator, a fourth diode, a fifth diode, and a thirteenth resistor, wherein
a power supply is coupled with a power supply terminal of the first voltage comparator, a power supply terminal of the second voltage comparator, and a first terminal of the thirteenth resistor, and a ground terminal of the first voltage comparator and a ground terminal of the second voltage comparator are grounded;
a non-inverting input terminal of the first voltage comparator is coupled with a transmission line for transmitting a first reference voltage, an inverting input terminal of the first voltage comparator is coupled with a transmission line for transmitting an analog voltage signal or a voltage signal of the load, an output terminal of the first voltage comparator is coupled with a cathode of the fourth diode, and an anode of the fourth diode is coupled with a second terminal of the thirteenth resistor, an anode of the fifth diode, and the output terminal of the wake-up module; and
a non-inverting input terminal of the second voltage comparator is coupled with a transmission line for transmitting the analog voltage signal or the voltage signal of the load, an inverting input terminal of the second voltage comparator is coupled with a transmission line for transmitting a second reference voltage, and an output terminal of the second voltage comparator is coupled with a cathode of the fifth diode.

7. The emergency starting power supply of claim 2, wherein
the voltage proportion-operation circuit comprises a first resistor, a second resistor, a third resistor, and a first diode; and
the filter circuit comprises a fourth resistor and a first capacitor.

8. The emergency starting power supply of claim 7, wherein a first terminal of the first resistor is coupled with a power supply, a first terminal of the third resistor is coupled with a first terminal of the load, a second terminal of the first resistor is coupled with a first terminal of the second resistor, a second terminal of the third resistor, a first terminal of the fourth resistor, and a cathode of the first diode, a second terminal of the fourth resistor is coupled with a first terminal of the first capacitor and a first input terminal of the MCU, and a second terminal of the second resistor, an anode of the first diode, and a second terminal of the first capacitor are grounded.

9. The emergency starting power supply of claim 8, wherein
the MCU is configured to receive, with the first input terminal of the MCU, an analog voltage signal;
the MCU is further configured to determine that the load is in polarity reverse connection when a voltage of the analog voltage signal is lower than a lower limit of a first voltage interval, and control the switch-control module to be in the switched-off state; and
the MCU is further configured to determine a voltage of the load according to the analog voltage signal.

10. The emergency starting power supply of claim 9, wherein the MCU is further configured to determine that the load is in polarity positive connection when the voltage of the analog voltage signal is higher than an upper limit of the first voltage interval.

11. The emergency starting power supply of claim 10, wherein the MCU is further configured to control the switch-control module to be in the switched-on state when a descending slope of the voltage of the analog voltage signal is greater than a preset slope threshold, based on a determination that the load is in polarity positive connection.

12. The emergency starting power supply of claim 9, wherein the MCU is further configured to determine that positive and negative poles of the load are short-circuited when the voltage of the analog voltage signal is within the first voltage interval, and control the switch-control module to be in the switched-off state.

13. The emergency starting power supply of claim 9, wherein the MCU is further configured to determine that an electrical connection between the power-supply output port and the load is abnormal when the voltage of the analog voltage signal is within a second voltage interval, wherein the first voltage interval does not intersect the second voltage interval.

14. The emergency starting power supply of claim 2, wherein the load-detection module comprises a polarity-detection circuit and a voltage-detection circuit.

15. The emergency starting power supply of claim 14, wherein
the polarity-detection circuit comprises a fifth resistor, a sixth resistor, a seventh resistor, an eighth resistor, a ninth resistor, a second capacitor, and a second diode; and
the voltage-detection circuit comprises a tenth resistor, an eleventh resistor, a twelfth resistor, a third capacitor, and a third diode.

16. The emergency starting power supply of claim 15, wherein a first terminal of the fifth resistor is coupled with a power supply, a second terminal of the fifth resistor is coupled with a first terminal of the sixth resistor, a first terminal of the eighth resistor, and a first terminal of the ninth resistor, a second terminal of the eighth resistor is coupled with a first terminal of the second capacitor and an output terminal of the polarity-detection circuit, a second terminal of the ninth resistor is coupled with a first terminal of the seventh resistor and an anode of the second diode, a cathode of the second diode is coupled with a first terminal of the load and a first terminal of the eleventh resistor, a second terminal of the eleventh resistor is coupled with a first terminal of the tenth resistor and a first terminal of the twelfth resistor, a second terminal of the twelfth resistor is coupled with a first terminal of the third capacitor and an output terminal of the voltage-detection circuit, a second terminal of the sixth resistor, a second terminal of the seventh resistor, a second terminal of the tenth resistor, a second terminal of the second capacitor, and a second terminal of the third capacitor are grounded.

17. The emergency starting power supply of claim 16, wherein
the MCU is configured to receive, with a second input terminal of the MCU, a polarity voltage signal outputted by the output terminal of the polarity-detection circuit; and the MCU is further configured to determine that the load is in polarity reverse connection when a voltage of the polarity voltage signal is within a third voltage interval, and control the switch-control module to be in the switched-off state.

18. The emergency starting power supply of claim 17, wherein the MCU is further configured to determine that the load is in polarity positive connection when the voltage of the polarity voltage signal is within a fourth voltage interval, wherein the third voltage interval does not intersect the fourth voltage interval.

19. The emergency starting power supply of claim 18, wherein the MCU is further configured to receive, with a third input terminal of the MCU, a voltage signal of the load outputted by the output terminal of the voltage-detection circuit based on a determination that the load is in polarity positive connection, and determine a voltage of the load according to the voltage signal of the load.

20. The emergency starting power supply of claim 2, wherein the load-detection module comprises a first switch, a second switch, a third switch, a fourth switch, and a load resistor.

21. The emergency starting power supply of claim 20, wherein a first terminal of the first switch and a first terminal of the fourth switch are coupled with a first terminal of the load, a first terminal of the second switch and a first terminal of the third switch are coupled with a second terminal of the load, a second terminal of the first switch and a second terminal of the second switch are coupled with a positive pole of the internal battery pack, a second terminal of the third switch and a second terminal of the fourth switch are coupled with a first terminal of the load resistor, a second terminal of the load resistor is coupled with a negative pole of the internal battery pack.

22. The emergency starting power supply of claim 21, wherein
the MCU is further configured to detect a first current on the load resistor when the first switch and the third switch are switched on and the second switch and the fourth switch are switched off;
the MCU is further configured to detect a second current on the load resistor when the first switch and the third switch are switched off and the second switch and the fourth switch are switched on;
the MCU is further configured to determine that the load is in polarity reverse connection when the first current is larger than the second current; and
the MCU is further configured to determine that the load is in polarity positive connection when the first current is smaller than the second current.

23. The emergency starting power supply of claim 21, wherein
the load-detection module further comprises a fifth switch and a sixth switch, wherein
a first terminal of the fifth switch is coupled with the first terminal of the load, and a second terminal of the fifth switch is coupled with the positive pole of the internal battery pack; and
a first terminal of the sixth switch is coupled with the second terminal of the load, and a second terminal of the sixth switch is coupled with the negative pole of the internal battery pack.

24. The emergency starting power supply of claim 2, further comprising:
a regulated power-supply module, comprising a sixth diode, a seventh diode, and a low-dropout (LDO) regulator, wherein an anode of the sixth diode is coupled with a positive pole of the internal battery pack, a cathode of the sixth diode is coupled with a cathode of the seventh diode and an input terminal of the LDO regulator, and an anode of the seventh diode is coupled with a positive pole of the load, wherein an output terminal of the LDO regulator is a power supply.

25. The emergency starting power supply of claim 2, further comprising:
a key input module, configured to transmit an interrupt signal to the MCU when the key input module receives a key activation signal, wherein the interrupt signal is used for switching the MCU from a sleep state or a standby state to a normal working state.

26. The emergency starting power supply of claim 2, further comprising:
a state indicating module, coupled with the MCU to realize state indication of the emergency starting power supply, wherein the state indication comprises a working-state indication and an alarm prompt.

27. The emergency starting power supply of claim 2, wherein the load is a capacitive load.

28. The emergency starting power supply of claim 27, wherein the capacitive load comprises any one or any combination of a battery, a super capacitor, and a lithium battery.

29. An intelligent battery clip, comprising:
a microcontroller unit (MCU);
a power-supply input port, electrically coupled with an internal battery pack of an emergency starting power supply;
a power-supply output port, electrically coupled with a load;
a switch-control module, comprising a first terminal electrically coupled with the internal battery pack via the power-supply input port, a second terminal electrically coupled with the load via the power-supply output port, and a control terminal configured to receive a control signal from the MCU; and
a load-detection module, configured to detect a state of the load and comprising a non-isolated member; and
wherein
the MCU is configured to control, according to the state of the load, the switch-control module to be in a switched-on state or a switched-off state, and
the load-detection module comprises a voltage proportion-operation circuit and a filter circuit.

30. The intelligent battery clip of claim 29, further comprising:
a current detector, arranged between the power-supply output port and the load and configured to detect a discharge current of the internal battery pack when the internal battery pack discharges to the load;
wherein the current detector transmits an overcurrent protection signal to the MCU when the discharge current is larger than an overcurrent threshold or the current detector transmits a short-circuit protection signal to the MCU when the discharge current is larger than a short circuit threshold; and
wherein the MCU is configured to control, according to at least one of the overcurrent protection signal and the short-circuit protection signal, the switch-control module to be in the switched-off state.

31. The intelligent battery clip of claim 29, further comprising:
a bidirectional current detection sensor, arranged between the power-supply output port and the load and configured to detect whether the internal battery pack is in a discharging state or a charging state;

wherein the bidirectional current detection sensor transmits a charging protection signal to the MCU when the internal battery pack is in the charging state; and wherein the MCU is configured to control the switch-control module to be in the switched-off state according to the charging protection signal.

* * * * *